H. KIBELE.
FIRELESS COOKER.
APPLICATION FILED MAY 25, 1912.
1,145,998.
Patented July 13, 1915.
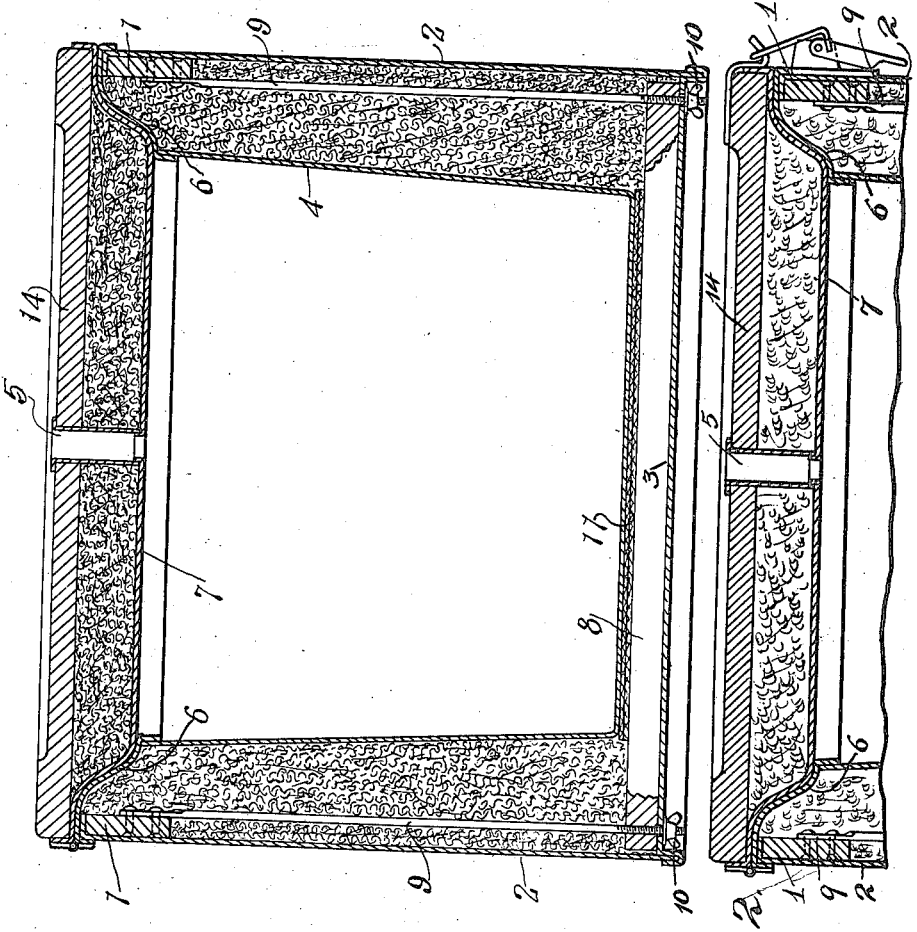
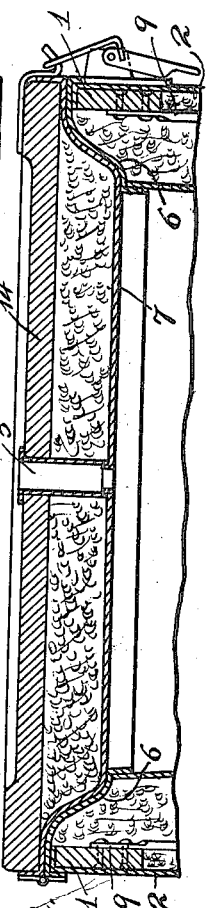

UNITED STATES PATENT OFFICE.

HECTOR KIBELE, OF BLUFFTON, OHIO, ASSIGNOR TO THE DILLER MANUFACTURING COMPANY, OF BLUFFTON, OHIO, A CORPORATION OF OHIO.

FIRELESS COOKER.

1,145,998.

Specification of Letters Patent.

Patented July 13, 1915.

Application filed May 25, 1912. Serial No. 899,627.

*To all whom it may concern:*

Be it known that I, HECTOR KIBELE, a citizen of the United States, residing at Bluffton, in the county of Allen and State of Ohio, have invented certain new and useful Improvements in Fireless Cookers, of which the following is a specification, reference being had therein to the accompanying drawing.

This invention relates to fireless cookers and the object of the invention is to provide means whereby a tight joint may be secured between the body portion of the cooker and the closure and whereby this joint may be maintained tight throughout the life of the cooker.

To this end it is a further object of the invention to provide the cooking compartment or receptacle with a seat adapted to be engaged by a part carried by the closure, to form the joint, and to provide means whereby the cooking compartment may be moved to adjust the seat relatively to the closed position of the lid or closure.

In the accompanying drawing Figure 1 is a vertical section taken centrally through a cooker embodying my invention; and Fig. 2 is a vertical section taken through the upper part of the cooker.

In the drawing I have illustrated one embodiment of the invention and have shown the same as comprising a body portion and a lid movably mounted thereon. The body portion is shown as comprising a frame or casing consisting of upper frame members 1 having secured thereto side members 2 of sheet metal, the bottom of the casing being closed by a bottom piece, 3, of sheet metal, which is here shown as provided with lips to receive the lower ends of the side walls 2. Mounted within the casing is a food compartment or receptacle 4 which is separated from the bottom and side walls of the casing by a space which is filled with suitable insulating material. The closure or lid is shown at 14 and may be mounted on the body portion 1 in any suitable manner, as by hinging one edge of it to one of the frame members 1 in the usual manner. The body portion of the cooker is provided with a seat and the lid or closure is provided with a part adapted, when the lid is in its closed position, to engage this seat and form a tight joint which will effectually prevent the escape of steam or other vapors. The lid is here shown as provided with a relief port 5 which, in practice, is provided with a valve to control the escape of steam from the food compartment. This valve forms no part of the present invention and need not be here shown. In the construction of the device here shown the food compartment or receptacle 4 is provided at its open edge, which, in the present instance, is its upper edge, with a laterally extending flange 6 rigidly secured to and in effect forming a part of the receptacle and having its outer edge secured to the frame members 1 and forming the upper retaining wall to confine the insulating material. This flange is preferably shaped to form a seat adapted to be engaged by a depending portion 7 carried by the lid 2 and shaped to fit snugly within the seat formed by the flange 6 and form a tight joint between the body portion of the cooker and the closure therefor.

In assembling the cooker difficulty is experienced in securing the exact adjustment of the parts to render the joint perfectly tight, and further, after the device has been in use for a period of time it not infrequently happens that the flange 6 will become depressed or sag in such a way as to loosen the joint. To enable a tight joint to be secured in the first instance with a minimum of trouble and to maintain this joint tight throughout the life of the cooker I have provided means for adjusting one of the joint-forming members relatively to the other. In the form here shown the food compartment 4 is capable of bodily movement toward and away from the normal position of the closure, this movement being permitted by the flexibility of the flange 6 and serving to adjust the seat formed by this flange relatively to the closed position of the lid. This movement may be imparted to the compartment or receptacle in any suitable manner. That here shown consists in mounting the receptacle upon a supporting member, such as a transverse bar 8, which bar is so connected with the frame members 1 that it can be caused to move toward or away from the same. One very efficient method of accomplishing this movement is by securing a pair of rods 9 to the frame members and allowing these rods to extend downward along the side members 2 of the casing through the end portions of the supporting bar 8 and through the bottom wall 3 of the casing where they may be provided with nuts 10. Obviously, when the nuts 10 are tightened upon the ends of the rods the bar 8 will be forced upward and will carry with it the compartment or receptacle 4, thus moving the seat formed by the flange 5 toward the closed position of the lid and serving to tighten the joint.

The tightening of the nuts on the rods will, of course, cause the flexible bottom 3 to bend or buckle and will, to a slight extent laterally displace the openings through which the ends of the rods extend, but these openings, as shown in the drawings, are of ample size to permit this displacement without causing the rods to bind or to be laterally displaced. Consequently, the rods will remain in their proper positions relatively to the transverse bar 8 and this bar will move freely upon the rods. While it is only necessary that the openings in this bar should be sufficiently large to permit of a free movement longitudinally of the rods, in the ordinary manufacture of this device, the openings in the bar are made somewhat larger than the diameter of the rods to facilitate the assembling of the device and owing to this slightly larger diameter of the openings any slight lateral displacement of the rods will not cause the bar to bind. The space about the bar 8 and between the bottom of the receptacle or compartment 4 and the bottom wall 3 of the casing may be filled with insulating material and suitable insulating material may be interposed between the bottom of the compartment and the supporting bar, as indicated at 11.

It will be apparent from the foregoing description that I have provided a very efficient method of securing and maintaining a tight joint between the body portion of the cooker and the closure therefor and have provided means whereby one of the members forming the joint can be adjusted from the exterior of the casing to tighten the joint.

I wish it to be understood that I consider myself the first to provide adjusting means for this purpose, in a fireless cooker, and I further wish it to be understood that while I have shown and described one embodiment of the invention, this has been chosen for the purpose of illustration and I do not wish to be limited to the details of construction shown and described, for obvious modifications will occur to a person skilled in the art.

Having thus fully described my invention, what I claim as new and desire to secure by Letters Patent, is:—

1. A fireless cooker comprising a frame, a food receptacle supported by said frame, a movable closure for said receptacle, means to attach said closure to said frame, said receptacle and said closure having parts coöperating to form a joint when said closure is in its closed position, and means to adjust one of said parts relatively to and independently of the other to regulate the tightness of said joint.

2. A fireless cooker comprising a frame, a food receptacle supported by said frame, a movable closure for said receptacle, means to attach said closure to said frame, said receptacle and said closure having parts coöperating to form a joint when said closure is in its closed position, and means operable from the exterior of said cooker to adjust one of said parts relatively to and independently of the other to regulate the tightness of said joint.

3. A fireless cooker comprising a frame, a food receptacle supported by said frame, a movable closure for said receptacle, and means to attach said closure to said frame, said receptacle and said closure having parts supported thereby and coöperating to form a joint when said closure is in its closed position, one of said parts being adjustable relatively to its supporting member.

4. A fireless cooker comprising a frame, a food receptacle carried by said frame and having a seat at its open end, a closure for said receptacle having a part adapted to fit upon said seat, means for adjusting said seat relatively to said frame, and means to attach said closure to said frame.

5. A fireless cooker comprising a frame, a food receptacle carried by said frame and having a seat at its open end, a closure for said receptacle having a part adapted to fit upon said seat, means to attach said closure to said frame, and means operable from the exterior of said cooker to adjust said seat relatively to said frame.

6. A fireless cooker comprising, a frame, a food receptacle carried by said frame and having a seat at its open end, a closure for said receptacle having a part adapted to fit upon said seat, and means for attaching said closure to said frame, means to adjust said food receptacle relatively to said frame to adjust said seat relatively to the closed position of said closure.

7. In a fireless cooker, a frame, a receptacle adjustably mounted on said frame and having a seat at its open end, a closure having a part to engage said seat, said closure being supported independently of said receptacle, means to impart movement to said receptacle to adjust the seat relatively to said frame, and means to attach said closure to said frame.

8. In a fireless cooker, a casing, a receptacle mounted in said casing and having at its open end a flange secured to said casing and forming a seat, a closure movably mounted on said casing and having a part to engage said seat, said receptacle being movable relatively to said casing to adjust said seat relatively to said closure.

9. In a fireless cooker, a casing, a receptacle mounted in said casing and having at its open end a flange secured to said casing and forming a seat, a closure movably mounted on said casing and having a part to engage said seat, and means operable from the exterior of said casing for moving said receptacle relatively to said casing to alter the position of said flange and adjust the seat relatively to said closure.

10. In a fireless cooker, a frame, a food receptacle mounted within said frame and having a seat at its open end, a closure for said receptacle having a part coöperating with said seat to form a tight joint, means to attach said closure to said frame, a rod secured to said frame, and adjustable means for connecting said rod with said receptacle.

11. In a fireless cooker, a frame, a food receptacle mounted within said frame and having a seat at its open end, a closure for said receptacle supported by said frame and having a part coöperating with said seat to form a tight joint, a rod secured to said frame, a bar extending across the closed end of said receptacle and having openings through which the ends of said rod pass, and nuts mounted on the ends of said rod to adjust said bar relatively to said rod.

12. In a fireless cooker, a casing having a closure, a receptacle mounted within said casing and having at its upper end an outwardly extending flange, the outer edges of which are connected with said casing, a supporting member arranged beneath the closed end of said receptacle, rods secured to the upper part of said casing, extending downwardly through said supporting member and through the bottom of said casing, and nuts mounted on said rods outside of said bottom wall.

In testimony whereof, I affix my signature in presence of two witnesses.

HECTOR KIBELE.

Witnesses:
R. L. TRIPLETT,
JOSEPH P. OWENS.